United States Patent
Kim et al.

(10) Patent No.: US 11,803,267 B2
(45) Date of Patent: *Oct. 31, 2023

(54) TOUCH DISPLAY PANEL AND TOUCH DISPLAY DEVICE

(71) Applicant: LG Display Co., Ltd., Seoul (KR)

(72) Inventors: Jinseong Kim, Gyeonggi-do (KR); YongChan Park, Seoul (KR); Haewon Lee, Seoul (KR); JuHan Kim, Gyeonggi-do (KR)

(73) Assignee: LG DISPLAY CO., LTD., Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 17/990,241

(22) Filed: Nov. 18, 2022

(65) Prior Publication Data
US 2023/0085436 A1 Mar. 16, 2023

Related U.S. Application Data

(63) Continuation of application No. 17/344,883, filed on Jun. 10, 2021, now Pat. No. 11,520,425, which is a
(Continued)

(30) Foreign Application Priority Data

Dec. 28, 2019 (KR) ........................ 10-2018-0171939

(51) Int. Cl.
*G06V 40/13* (2022.01)
*G06F 3/041* (2006.01)
(Continued)

(52) U.S. Cl.
CPC ............ *G06F 3/0412* (2013.01); *G06F 3/047* (2013.01); *G06F 3/0443* (2019.05); *G06F 2203/04107* (2013.01)

(58) Field of Classification Search
None
See application file for complete search history.

(56) References Cited

U.S. PATENT DOCUMENTS

| 2015/0109548 A1 | 4/2015 | Kim et al. |
| 2016/0019854 A1 | 1/2016 | Liu et al. |

(Continued)

FOREIGN PATENT DOCUMENTS

| CN | 104123039 A | 10/2014 |
| CN | 105845033 A | 8/2016 |

(Continued)

OTHER PUBLICATIONS

1st Office Action issued in Chinese Patent Application No. 201911316714.2 dated Mar. 14, 2023.
(Continued)

*Primary Examiner* — Joseph R Haley
(74) *Attorney, Agent, or Firm* — Morgan, Lewis & Bockius LLP

(57) ABSTRACT

In a touch display panel and a touch display device, a shielding pattern including the common electrode (COM) used as the touch electrode (TE) is disposed between a touch line (TL) and a data line (DL), and the touch line (TL) and the data line (DL) are arranged so as not to overlap each other in a boundary area between shielding patterns. The parasitic capacitance between the touch line (TL) and the data line (DL) can be reduced to improve the performance of touch sensing. In addition, the arrangement of the touch lines (TL) and data lines (DL) in the boundary area between shielding patterns is repeated at regular intervals to prevent an image abnormality.

11 Claims, 17 Drawing Sheets

Related U.S. Application Data continuation of application No. 16/727,341, filed on Dec. 26, 2019, now Pat. No. 11,054,926.

(51) Int. Cl.
 *G06F 3/044* (2006.01)
 *G06F 3/047* (2006.01)

(56) References Cited

U.S. PATENT DOCUMENTS

| | | |
|---|---|---|
| 2016/0282981 A1 | 9/2016 | Ding et al. |
| 2018/0011577 A1 | 1/2018 | Lee et al. |
| 2018/0188858 A1 | 7/2018 | Zhang et al. |
| 2018/0292930 A1 | 10/2018 | Lee et al. |
| 2019/0103069 A1 | 4/2019 | Choi |
| 2019/0235675 A1 | 8/2019 | Wu et al. |
| 2019/0243495 A1 | 8/2019 | Guo et al. |
| 2021/0294458 A1 | 9/2021 | Tominaga et al. |

FOREIGN PATENT DOCUMENTS

| | | |
|---|---|---|
| CN | 106292036 A | 1/2017 |
| CN | 108182883 A | 6/2018 |
| CN | 108254987 A | 7/2018 |
| KR | 1020150046901 A | 5/2015 |
| WO | 2018168682 A1 | 9/2018 |

OTHER PUBLICATIONS

Office Action issued in Korean Patent No. 10-2018-0171939 dated Mar. 31, 2023.

<Planar View>

<Cross-section View>

<TL Avoidance Case>

<DL Avoidance Case>

<TL, DL Avoidance Case>

<Cp Occurrence Portion Line Width Adjustment Example>

TOUCH DISPLAY PANEL AND TOUCH DISPLAY DEVICE

CROSS REFERENCE TO RELATED APPLICATION

This application is a continuation of U.S. application Ser. No. 17/344,883 filed Jun. 10, 2021, which is a continuation of U.S. patent application Ser. No. 16/727,341 filed Dec. 26, 2019, which claims priority from Korean Patent Application No. 10-2018-0171939, filed on Dec. 28, 2018.

BACKGROUND

1. Technical Field

The present disclosure relates to a touch display panel and a touch display device.

2. Discussion of the Related Art

As the information society develops, the demand for display devices for displaying images is increasing in various forms. Various types of display devices such as a liquid crystal display device (LCD), and an organic light emitting display device (OLED) have been used for this purpose.

In order to provide the user with various functions, the display device may provide a function of recognizing the user's touch on the display panel and performing input processing based on the recognized touch.

The display device capable of recognizing a touch, for example, may apply the touch driving signal to a plurality of touch electrodes disposed on or embedded in the display panel, and may detect the presence or absence of touch and the touch coordinates by sensing a change in capacitance caused by a user's touch.

In the display device capable of providing the touch recognition function, electrodes and signal lines to which various voltages, signals for driving the display are applied may be arranged on the display panel. Therefore, there may be a problem that the performance of the touch sensing may be degraded due to the parasitic capacitances generated between electrodes and lines for driving the display and electrodes and lines for touch sensing.

SUMMARY

Accordingly, embodiments of the present disclosure are directed to a touch display panel and a touch display device that substantially obviate one or more of the problems due to limitations and disadvantages of the related art.

An aspect of the present disclosure is to provide a touch display panel and a touch display device capable of reducing noise on a touch sensing signal, detected through a touch line, by reducing the parasitic capacitance generated between electrodes and lines for driving the display and electrodes and lines for touch sensing.

Another aspect of the present disclosure is to provide a touch display panel and a touch display device for preventing image abnormality from occurring in the structure capable of reducing noise on a touch sensing signal.

Additional features and aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

To achieve these and other aspects of the inventive concepts, as embodied and broadly described, a touch display panel comprises a plurality of data lines; a plurality of touch lines, each of the touch lines at least partially overlapping one of the data lines; and a plurality of shielding patterns disposed between the data lines and the touch lines, the plurality of shielding patterns comprising a first shielding pattern and a second shielding pattern which are disposed adjacent to each other, wherein each touch line does not overlap the associated data line in an area between the first shielding pattern and the second shielding pattern. The touch display panel may be configured to use at least one of the shielding patterns as a touch electrode and/or as a common electrode.

A touch display panel may include: a data line; a planarization layer disposed on the data line; a common electrode disposed on the planarization layer; a touch load reduction layer disposed on the common electrode; and a touch line disposed on the touch load reduction layer, wherein at least a part of a portion in which the touch line overlaps with the common electrode overlaps with the data line, wherein a portion of the touch line disposed between adjacent common electrodes does not overlap the data line. In the area between adjacent common electrodes, the touch line or the data line may be bent, or the touch line is bent to one side and the data line is bent to the opposite side. In the area between adjacent common electrodes, the width of the touch line may be smaller than the width of the touch line in the area overlapping with the common electrode. In the area between adjacent common electrodes, the width of the data line may be smaller than the width of the data line in the area overlapping with the common electrode. Portions of the touch line and the data line overlapped with the common electrode may be formed by repeating the structure in the area between adjacent common electrodes at specific intervals.

A touch display device may include: a plurality of touch electrodes embedded in a panel; a plurality of touch lines respectively connected electrically to the plurality of touch electrodes; a plurality of data lines partially overlapping the touch lines; and a plurality of shielding patterns disposed between the touch lines and the data lines, wherein, in an area between a first shielding pattern and a second shielding pattern which are electrically separated and disposed adjacent to each other, the touch line is disposed in an area not overlapped with the data line. Portions of the touch line and the data line overlapped with the shielding pattern may be formed by repeating the structure in the area between the first shielding pattern and the second shielding pattern at specific intervals. The plurality of shielding patterns may be disposed on the same layer as the touch electrode, and may be integrated with one of the touch electrodes. The touch display device may be configured to moulate a data voltage based on a touch driving signal and to apply the modulated data voltage to at least one data line of the plurality of data lines during at least a part of a period during which the touch driving signal is applied to at least one of the touch electrodes.

A touch display device may include: a first data line; a first touch line; a first touch electrode block including a first touch electrode; and a second touch electrode block including a second touch electrode and disposed adjacent to the first touch electrode block, wherein the first touch line and the first data line are disposed so as to be overlapped with the first touch electrode block and the second touch electrode block, wherein the first touch line and the first data line include a plurality of first areas in which a region overlapping each other is larger than a region not overlapping each other, wherein the first touch line and the first data line include a plurality of second areas in which a region not overlapping each other is larger than a region overlapping each other, wherein the first area and the second area are repeatedly arranged along a direction in which the first touch line and the first data line are arranged, and only the second area is disposed in a boundary area between the first touch electrode block and the second touch electrode block. The first touch electrode of the first touch electrode block may include a protrusion in which a part of the first touch electrode protrudes into the boundary area between the first touch electrode block and the second touch electrode block, and the protrusion may overlap at least one of the first touch line and the first data line. The touch display device may further comprise a first touch load reduction layer disposed along a direction in which the first touch line is arranged at a lower portion of the first touch line. The number of bent structures of the first touch lines may be larger than the number of bent structures of the first data lines, or the number of bent structures of the first data lines may be larger than the number of bent structures of the first touch lines. The touch display device may further comprise a third touch electrode block including a third touch electrode, wherein the first touch line is electrically connected to the third touch electrode of the third touch electrode block.

Parasitic capacitance between the touch line and the data line may be prevented from being formed by disposing the shielding pattern to which a signal corresponding to the touch driving signal applied to the touch line is applied between the touch line and the data line.

In addition, the parasitic capacitance between the touch line and the data line can be reduced in the area where the shielding pattern is not arranged by disposing the touch line and the data line so as not to overlap with each other in the boundary area of the shielding pattern.

Also, in the portion where the touch line overlaps with the shielding pattern, the structure of the touch line in the boundary area of the shielding pattern is repeated at regular intervals, so that an image abnormality due to the layout structure of the touch line can be prevented.

It is to be understood that both the foregoing general description and the following detailed description are exemplary and explanatory and are intended to provide further explanation of the inventive concepts as claimed.

BRIEF DESCRIPTION OF THE DRAWINGS

The accompanying drawings, which are included to provide a further understanding of the disclosure and are incorporated and constitute a part of this application, illustrate embodiments of the disclosure and together with the description serve to explain various principles. In the drawings.

DETAILED DESCRIPTION

Figure 1:
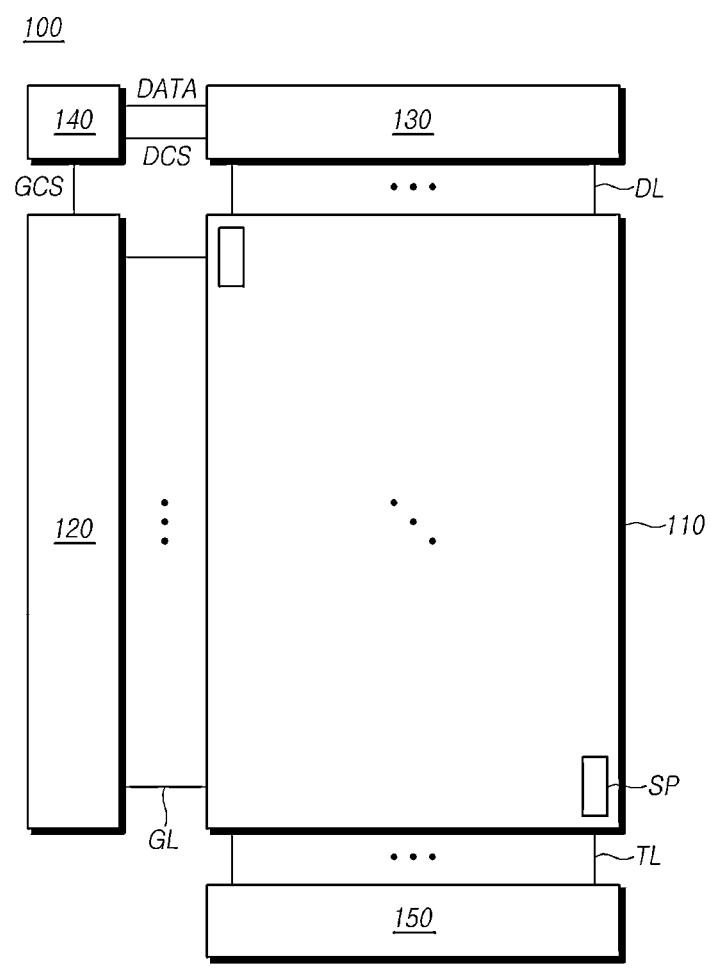
FIG. 1 is a diagram illustrating a schematic configuration of a display device.

Hereinafter, some embodiments of the present disclosure will be described in detail with reference to the accompanying illustrative drawings. In designating elements of the drawings by reference numerals, the same elements will be designated by the same reference numerals although they are shown in different drawings. Further, in the following description of the present disclosure, a detailed description of known functions and configurations incorporated herein will be omitted when it would overload the present disclosure.

In addition, terms, such as first, second, A, B, (a), (b) or the like may be used herein when describing components of the present disclosure. Each of these terminologies is not used to define an essence, order or sequence of a corresponding component but used merely to distinguish the corresponding component from other component(s). In the case that it is described that a certain structural element "is connected to", "is coupled to", or "is in contact with" another structural element, it should be interpreted that another structural element may "be connected to", "be coupled to", or "be in contact with" the structural elements as well as that the certain structural element is directly connected to or is in direct contact with another structural element.

FIG. 1 is a diagram illustrating a schematic configuration of a display device 100.

Referring to FIG. 1, the display device 100 may include a touch display panel 110, a gate driving circuit 120, a data driving circuit 130 and a controller 140. The display device 100 may further include a touch driving circuit 150 for sensing a touch on the touch display panel 110.

In the touch display panel 110, a plurality of gate lines GL and a plurality of data lines DL are arranged, and a plurality of subpixels SP may be arranged in an area where the gate lines GL and the data lines DL intersect each other.

A plurality of touch electrodes TE may be disposed or embedded in the touch display panel 110, and a plurality of touch lines TL electrically connecting the touch electrodes TE and the touch driving circuit 150 may be disposed.

The configuration for driving the display in the touch display device 100 will be described first. The gate driving circuit 120 may control the driving timing of the subpixel SP disposed on the touch display panel 110. The data driving circuit 130 may supply the data voltage Vdata corresponding to the image data to the subpixel SP so that the subpixel SP displays the image by indicating the brightness corresponding to the gray level of the image data.

More specifically, the gate driving circuit 120 is controlled by the controller 140 and sequentially outputs scan signals to a plurality of gate lines GL disposed on the touch display panel 110 so as to control the driving timing of the subpixel SP.

The gate driving circuit 120 may include at least one gate driver integrated circuit (GDIC), and may be located only on one side of the touch display panel 110 according to the driving method, or on both sides of the touch display panel 110 according to the driving method.

Each gate driver integrated circuit (GDIC) may be connected to the bonding pad of the touch display panel 110 by a tape automated bonding (TAB) method or a chip on glass (COG) method. Alternatively, each gate driver integrated circuit (GDIC) may be implemented as a gate-in-panel (GIP) type and directly disposed on the touch display panel 110, or may be integrated on the touch display panel 110. In addition, each gate driver integrated circuit (GDIC) may be implemented by a chip on film (COF) method, which is mounted on a film connected to the touch display panel 110.

The data driving circuit 130 may receive image data (or input data) from the controller 140, and may convert the image data into the analog-type data voltage. The data voltages may be outputted to the respective data lines DL in accordance with the applying timing of the scan signals through the gate lines GL so that each subpixel SP expresses the brightness according to the image data.

The data driving circuit 130 may include one or more source driver integrated circuits (SDICs).

Each source driver integrated circuit (SDIC) may include a shift register, a latch circuit, a digital-to-analog converter, an output buffer, and the like.

Each source driver integrated circuit (SDIC) may be connected to a bonding pad of the touch display panel 110 by a tape automated bonding (TAB) method or a chip on glass (COG) method. Alternatively, each source driver integrated circuit (SDIC) may be directly disposed on the touch display panel 110, or may be integrated and disposed on the touch display panel 110 depending on the case. In addition, each source driver integrated circuit (SDIC) may be implemented in a chip-on-film (COF) manner, and in this case, each source driver integrated circuit (SDIC) may be mounted on a film connected to the touch display panel 110 and may be electrically connected to the touch display panel 110 through lines on the film.

The controller 140 may supply several control signals to the gate driving circuit 120 and the data driving circuit 130 and may control the operations of the gate driving circuit 120 and the data driving circuit 130.

The controller 140 may control the gate driving circuit 120 to output the scan signal in accordance with the timing to be implemented in each frame, and may convert the image data received from the outside in accordance with the data signal format used by the data driving circuit 130, and may output the converted image data to the data driving circuit 130.

The controller 140 may receive several timing signals including a vertical synchronizing signal (VSYNC), a horizontal synchronizing signal (HSYNC), an input data enable signal (DE), a clock signal (CLK) in addition to the image data from the outside (e.g., the host system).

The controller 140 may generate various control signals using timing signals received from the outside, and may output the control signals to the gate driving circuit 120 and the data driving circuit 130.

For example, in order to control the gate driving circuit 120, the controller 140 may output various gate control signals (GCS) including a gate start pulse (GSP), a gate shift clock (GSC), a gate output enable signal (GOE) and the like.

Here, the gate start pulse (GSP) may control the operation start timing of one or more gate driver integrated circuit (GDIC) constituting the gate driving circuit 120. The gate shift clock (GSC) is a clock signal commonly input to one or more gate driver integrated circuits (GDIC), and controls the shift timing of the scan signal. The gate output enable signal (GOE) may specify the timing information of one or more gate driver integrated circuits (GDICs).

In order to control the data driving circuit 130, the controller 140 may output various data control signals (DCS) including a source start pulse (SSP), a source sampling clock (SSC), a source output enable signal (SOE), and the like.

Here, the source start pulse (SSP) controls the data sampling start timing of one or more source driver integrated circuits (SDIC) constituting the data driving circuit 130. The source sampling clock (SSC) is a clock signal for controlling the sampling timing of data in each of the source driver integrated circuits (SDIC). The source output enable signal (SOE) controls the output timing of the data driving circuit 130.

The touch display device 100 may further include a power management integrated circuit (not shown) capable of supplying various voltages or currents to the touch display panel 110, the gate driving circuit 120, the data driving circuit 130, and the touch driving circuit 150 or capable of controlling various voltages or currents to be supplied.

Each of the subpixels SP may be defined by the intersection of the gate line GL and the data line DL, and the liquid crystal or the light emitting element may be disposed in each subpixel depending on the type of touch display device 100.

For example, in the case that the touch display device 100 is a liquid crystal display device, the liquid crystal display device may include a light source device such as a backlight unit that emits light to the touch display panel 110, and the liquid crystal may be arranged in the subpixel of the touch display panel 110. Also, the image can be displayed indicating the brightness according to the image data by adjusting the arrangement of the liquid crystal by the electric field formed by the data voltage Vdata applied to each subpixel SP.

As another example, in the case that the touch display device 100 is an organic light emitting display device, an organic light emitting diode (OLED) may be disposed in each of the subpixels SP, and it is possible to display the brightness according to the image data by controlling the current flowing through the organic light emitting diode (OLED) based on the data applied to each subpixel SP.

Alternatively, the light emitting diode (LED) may be disposed in each subpixel SP to display an image.

The touch display device 100 may detect the user's touch on the touch display panel 110 by using the touch electrode TE and the touch driving circuit 150 included in the touch display panel 110.

Figure 2:
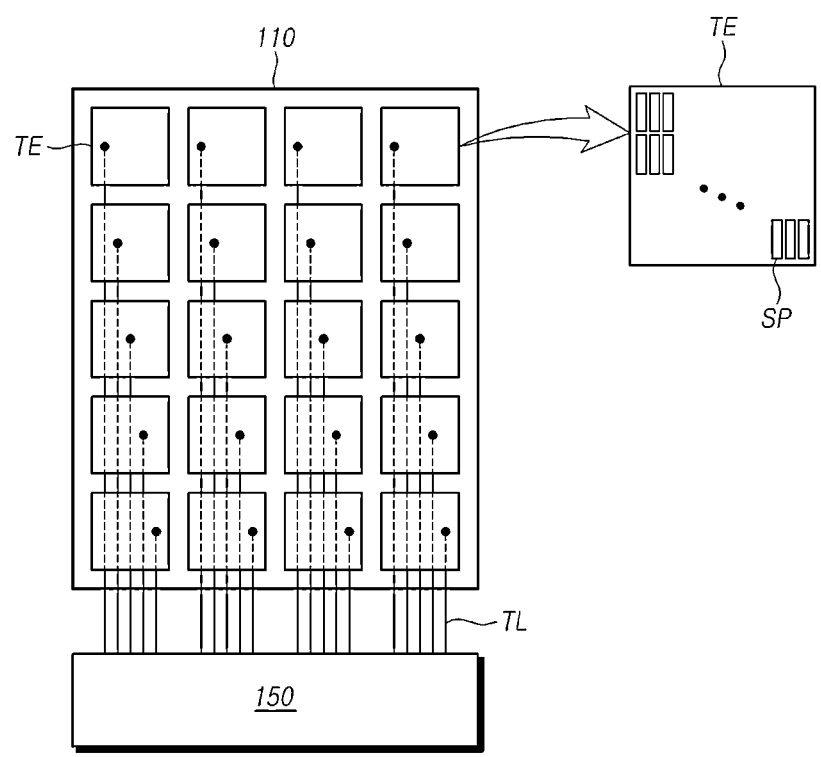
FIG. 2 illustrates an example of the arrangement structure of the touch electrodes included in the touch display device illustrated in FIG. 1.

FIG. 2 illustrates an example of the touch electrode TE disposed on the touch display panel 110 and the touch drive circuit 150 driving the touch electrode TE in the touch display device.

Referring to FIG. 2, the touch display panel 110 may include a plurality of touch electrodes TE and a plurality of touch lines TL for connecting the touch electrodes TE to the touch driving circuit 150.

The touch electrode TE may be disposed on the touch display panel 110 or may be embedded therein. The touch electrode TE may be an electrode used for driving the display, or the touch electrode TE may be an electrode separately disposed for touch sensing. Further, the touch electrode TE may be in the form of a transparent single electrode having no open region, or may be in the form of an opaque mesh. Alternatively, the touch electrode TE may be in the form of a transparent electrode in which the open region is partially present.

For example, in the case that the touch display device 100 is the liquid crystal display device, the touch electrode TE may be embedded in the touch display panel 110, and may be the common electrode COM to which the common voltage Vcom is applied.

That is, the common electrode COM may be arranged in a divided structure in the touch display panel 110 and may be used as the touch electrode TE for touch sensing. Therefore, each of the touch electrodes TE may be disposed in overlapping with the plurality of subpixels SP.

The following description will be given by way of an example in which the touch display device 100 is a liquid crystal display device for convenience of explanation, but the invention not limited thereto.

The touch electrode TE may be electrically connected to the touch driving circuit 150 through the touch line TL disposed on the touch display panel 110.

The touch driving circuit 150 may include an amplifier for outputting the touch driving signal TDS to the touch electrode TE and receiving the touch sensing signal TSS from the touch electrode TE, an integrator for integrating the output signal of the amplifier, and an analog-to-digital converter for converting the output signal of the integrator into a digital signal.

The touch driving circuit 150 may be integrated with the data driving circuit 130 depending on the case.

The touch driving circuit 150 may be connected to the touch electrode TE in a one-to-one manner to receive the touch sensing signal TSS. That is, the touch driving circuit 150 may output the touch driving signal TDS to the touch electrode TE through the touch line TL and may receive the touch sensing signal TSS so as to sense the change of self-capacitance caused by a touch.

Alternatively, the touch electrode TE may be disposed to be divided into the driving electrode and the sensing electrode, and the touch driving circuit 150 may be connected to the driving electrode and the sensing electrode, respectively. In this case, the touch driving circuit 150 may output the touch driving signal TDS to the driving electrode and may receive the touch sensing signal TSS from the sensing electrode so as to sense the change of mutual capacitance between the driving electrode and the sensing electrode.

The touch driving circuit 150 may convert the received touch sensing signal TSS into sensing data in digital form and may transmit the converted sensing data to the touch controller.

The touch controller may control the driving of the touch driving circuit 150, and may receive the sensing data from the touch driving circuit 150 and detect the touch of the user to the touch display panel 110 based on the received sensing data.

That is, the touch controller can detect the change of the self-capacitance or the change of the mutual capacitance from the sensing data, and detect the presence or absence of the touch, the touch coordinate, and the like based on the detected change of the capacitance.

Furthermore, the touch driving circuit 150 may perform touch sensing during the period time-divided with the display driving period, or may perform touch sensing at the same time as the display driving period.

Figure 3:
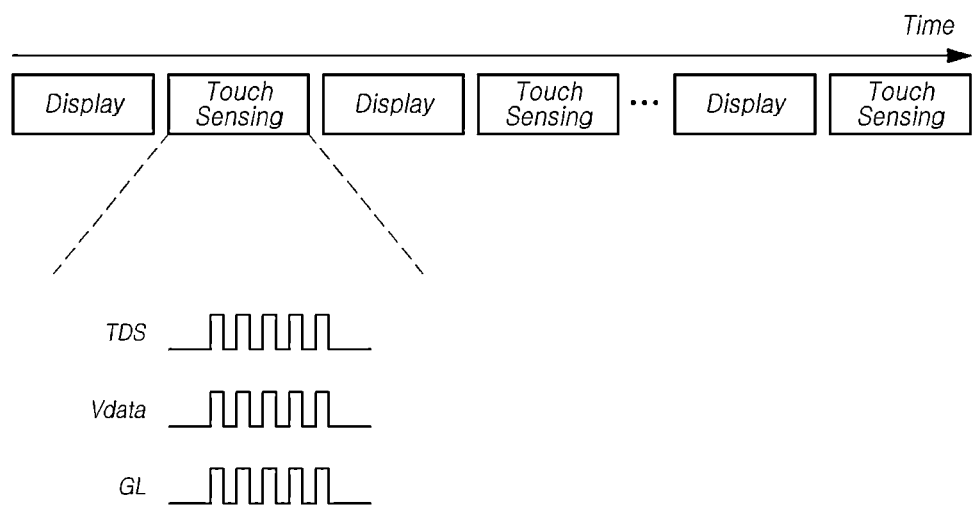
FIG. 3 illustrates an example of the timing of the touch sensing and the display driving of the touch display device.

FIG. 3 is a diagram illustrating an example of the timing of the touch sensing and the display driving of the touch display device 100. In this case, the display driving and touch sensing are performed in time divided periods.

Referring to FIG. 3, the touch display device 100 may drive the touch electrode TE included in the touch display panel 110 during a period (e.g., a blank period) between display driving periods so as to perform touch sensing.

For example, the touch display device 100 may perform touch sensing in the vertical blank period existing for each image frame. Alternatively, touch sensing may be performed in some horizontal blank periods among a plurality of horizontal blank periods existing in one image frame.

In the case that the common electrode COM included in the touch display panel 110 is used as the touch electrode TE, the common voltage Vcom may be applied to the touch electrode TE through the touch line TL connected to each touch electrode TE during the display driving period, and the touch driving signal TDS may be applied to the touch electrode TE through the touch line TL connected to each touch electrode TE during the touch sensing period.

The touch driving signal TDS may be a pulse-shaped signal whose voltage varies with time.

Here, since the display driving is not performed during the touch sensing period, the electrodes, the signal lines, and the like for driving the display may be in a voltage-unapplied state or in a constant voltage state. Therefore, the parasitic capacitance can be formed between the touch electrode TE to which the touch driving signal TDS is applied and the gate line GL, the data line DL and the like, and the sensing performance for the touch sensing signal TSS may be deteriorated due to such parasitic capacitance.

In order to prevent the parasitic capacitance formed between the touch electrode TE and the gate line GL, the data line DL and the like, the correspondent signal corresponding to the touch driving signal TDS applied to the touch electrode TE can be supplied to the gate line GL and the data line DL during the touch sensing period.

That is, as shown in the example shown in FIG. 3, the data voltage Vdata having the same amplitude and phase as the touch driving signal TDS can be supplied to the data line DL. In the touch sensing period, since the gate low voltage VGL is applied to the gate line GL, the signal having the same amplitude and phase as the touch driving signal TDS may be outputted as the gate line voltage VGL, so that the signal having the same amplitude and phase as the touch driving signal TDS may be supplied to the gate line GL.

In this manner, by supplying the signal having the same amplitude and phase as the touch driving signal TDS to the gate line GL and the data line DL during the touch sensing period as described above, the parasitic capacitance between the touch electrode TE and the signal line may not be formed, and the detection performance of the touch sensing signal TSS can be improved.

The touch display device 100 may simultaneously perform display driving and touch sensing.

Figure 4:
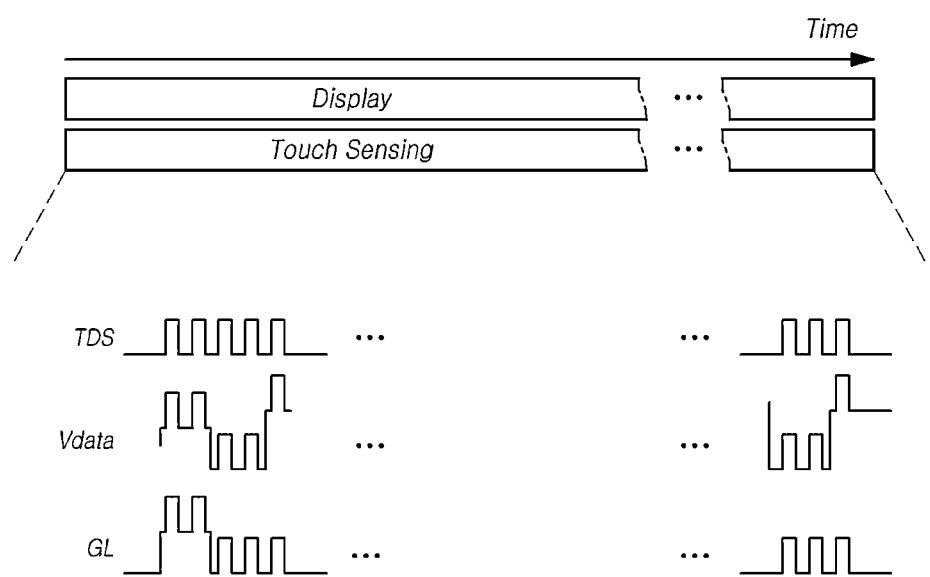
FIG. 4 illustrates another example of the timing of the touch sensing and the display driving of the touch display device.

FIG. 4 is a diagram illustrating another example of the timing of the touch sensing and the display driving of the touch display device 100, in which display driving and touch sensing are simultaneously performed.

Referring to FIG. 4, the touch display device 100 may perform touch sensing at the same time as the display driving period.

Here, the touch sensing period may be the same as the display driving period, or may be the blank period between the display driving periods. That is, the touch sensing can be performed independently of the display driving, and the touch sensing may be performed simultaneously with the display driving.

In the case that the touch sensing is performed simultaneously with the display driving, the touch driving signal TDS may be applied to the touch electrode TE. The data voltage Vdata may be supplied to the data line DL for driving the display and the scan signal generated using the gate high voltage VGH and the gate low voltage VGL may be output to the gate line GL.

At this time, in the case that the common electrode COM included in the touch display panel 110 is used as the touch electrode TE, since the touch driving signal TDS is applied to the touch electrode TE, the voltage difference corresponding to the image data may not be formed between the common electrode COM and the pixel electrode PXL to which the data voltage Vdata is applied.

That is, since the voltage of the touch driving signal TDS varies with time, the voltage difference corresponding to the image data may not be formed between the common electrode COM to which the touch driving signal TDS is applied and the pixel electrode PXL. Accordingly, the subpixel SP may not display the brightness corresponding to the image data.

Therefore, by supplying the data voltage Vdata modulated based on the touch driving signal TDS to the data line DL, the voltage difference corresponding to the image data can be formed between the common electrode COM to which the touch driving signal TDS is applied and the pixel electrode PXL.

The modulation of the data voltage Vdata may be performed, for example, by a method of modulating the gamma voltage used to generate the data voltage Vdata in the data driving circuit 130. Alternatively, the modulated data voltage Vdata may be supplied to the data line DL by modulating the ground voltage disposed in the touch display panel 110.

Also, by modulating the gate low voltage VGL based on the touch driving signal TDS, the modulated scan signal may be applied to the gate line GL so that the gate line GL can be normally driven.

As described above, the display driving and the touch sensing can be performed simultaneously by modulating the data voltage Vdata applied to the data line DL and the scan signal applied to the gate line GL based on the touch drive signal TDS.

Figure 5:
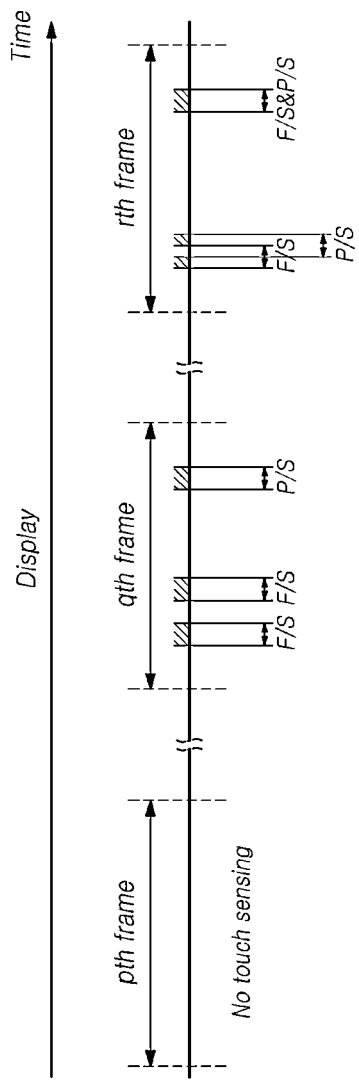
FIG. 5 illustrates various examples of timing of finger sensing and pen sensing according to the timing of the touch sensing and the display driving shown in FIG. 4.

FIG. 5 illustrates various examples of timing of finger sensing and pen sensing according to the timing of the touch sensing and the display driving shown in FIG. 4.

Referring to FIG. 5, the touch display device 100 may perform only the display driving, or may perform the touch sensing at the same time as the display driving. Also, the touch sensing may be performed only during a part of the display driving period, and the finger sensing (F/S) and pen sensing (P/S) may be performed in different periods or in the same period.

For example, as in the p-th frame, the touch display device 100 may perform only the display driving operation without performing touch sensing such as finger sensing (F/S) and pen sensing (P/S) during one frame.

Alternatively, as in the q-th frame, the touch display device 100 may perform touch sensing such as the finger sensing (F/S) or pen sensing (P/S) during a partial period during which the touch sensing is required during the display driving period. Here, the finger sensing (F/S) and pen sensing (P/S) may be performed in respective periods not overlapping with each other.

Alternatively, as in the r-th frame, the touch display device 100 may perform touch sensing during the display driving period and may perform finger sensing (F/S) and pen sensing (P/S) during the overlapped period. In this case, the sensing result of each of the finger sensing (F/S) and pen sensing (P/S) can be distinguished through an algorithm determined by the touch controller or signal analysis according to sensing position.

In addition to these examples, display driving and touch sensing (finger sensing, pen sensing) can be performed independently at various timings.

As described above, the touch sensing period can be sufficiently secured and the performance of the touch sensing can be improved by performing the touch sensing independently of the display driving. However, in this case, the parasitic capacitance due to the driving of the display can cause noise on the touch sensing signal TSS as the display driving is performed simultaneously.

Reducing the parasitic capacitance between the touch line TL and the signal line for driving a display improves the performance of touch sensing.

Figure 6:
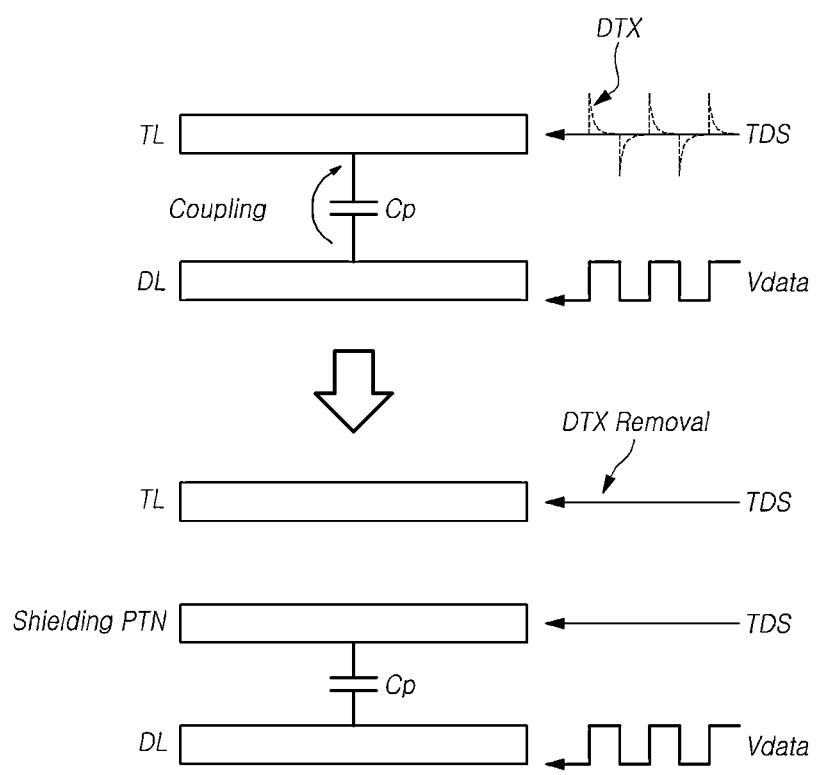
FIG. 6 conceptually illustrates the shielding pattern for reducing parasitic capacitance between the touch line and the data line in the touch display device.

FIG. 6 conceptually illustrates the shielding pattern (Shielding PTN) disposed for reducing parasitic capacitance between the touch line TL and the data line DL in the touch display device 100.

Referring to FIG. 6, at least a part of the touch line TL disposed on the touch display panel 110 may be arranged to overlap with the signal line for driving the display. For example, the touch line TL may be partially overlapped with the data line DL disposed on the touch display panel 110.

The data voltage Vdata may be applied to the data line DL during the display driving period. In addition, the touch driving signal TDS for touch sensing may be applied to the touch line TL during at least a part of the display driving period.

Here, for convenience of explanation, the case in which the touch driving signal TDS applied to the touch line TL is a constant voltage is described as an example, but the touch driving signal TDS may be an AC voltage in a pulse form.

Since there is the potential difference between the data voltage Vdata applied to the data line DL and the touch driving signal TDS applied to the touch line TL, the parasitic capacitance Cp may be formed between the data line DL and the touch line TL.

Therefore, the touch driving signal TDS applied to the touch line TL may be coupled to the data voltage Vdata applied to the data line DL, so that a crosstalk DTX may occur in the touch driving signal TDS in accordance with the variation of the data voltage Vdata. Also, the noise on the touch sensing signal TSS may occur due to the crosstalk DTX.

The shielding pattern is disposed between the touch line TL and the data line DL, so that it is possible to prevent noise on the touch sensing signal TSS caused by parasitic capacitance with respect to a data line DL.

For example, the shielding pattern may be disposed in an area where the touch line TL and the data line DL overlap each other. Further, the shielding pattern may be disposed in an area including an overlapped area.

Since the shielding pattern is disposed in the area in which the touch line TL and the data line DL overlap with each other, direct parasitic capacitance may be not formed between the touch line TL and the data line DL.

Also, the signal corresponding to the touch driving signal TDS applied to the touch line TL may be applied to the shielding pattern. For example, the signal having the same amplitude and phase as the touch driving signal TDS may be applied to the shielding pattern.

Therefore, since the parasitic capacitance is not formed between the touch line TL and the shielding pattern even if the parasitic capacitance Cp is formed between the shielding pattern and the data line DL, it is possible to prevent the touch sensing signal TSS on the touch line TL from being influenced.

That is, even if the touch sensing is performed during the display driving period, the crosstalk DTX may be not generated in the touch sensing signal TSS detected through the touch line TL, thereby improving the performance of the touch sensing.

Although the shielding pattern is disposed between the touch line TL and the data line DL as an example, however, in some cases, the shielding pattern may be disposed between the touch line TL and another signal line (e.g., a gate line, etc.) for driving the display.

The shielding pattern may be disposed by forming a separate metal layer between the touch line TL and the data line DL, or may be disposed using a metal layer disposed on the touch display panel 110.

For example, the shielding pattern may be disposed using a metal that forms the pixel electrode PXL disposed on the touch display panel 110.

Alternatively, the shielding pattern (shielding PTN) may be disposed using a metal forming the common electrode COM disposed on the touch display panel 110.

In this case, the shielding pattern may be formed integrally with the common electrode COM. Thus, it is possible to provide an advantage that it is not required to separately form the structure for applying the signal corresponding to the touch driving signal TDS to the shielding pattern.

Hereinafter, there will be described as an example of the case in which a shielding pattern disposed between the touch line TL and the data line DL is formed integrally with the common electrode COM used as the touch electrode TE.

That is, the shielding pattern (Shieling PTN) may be implemented as being formed integrally with the common electrode COM, and a part of the common electrode COM may provide the function of the shielding pattern.

Figure 7:
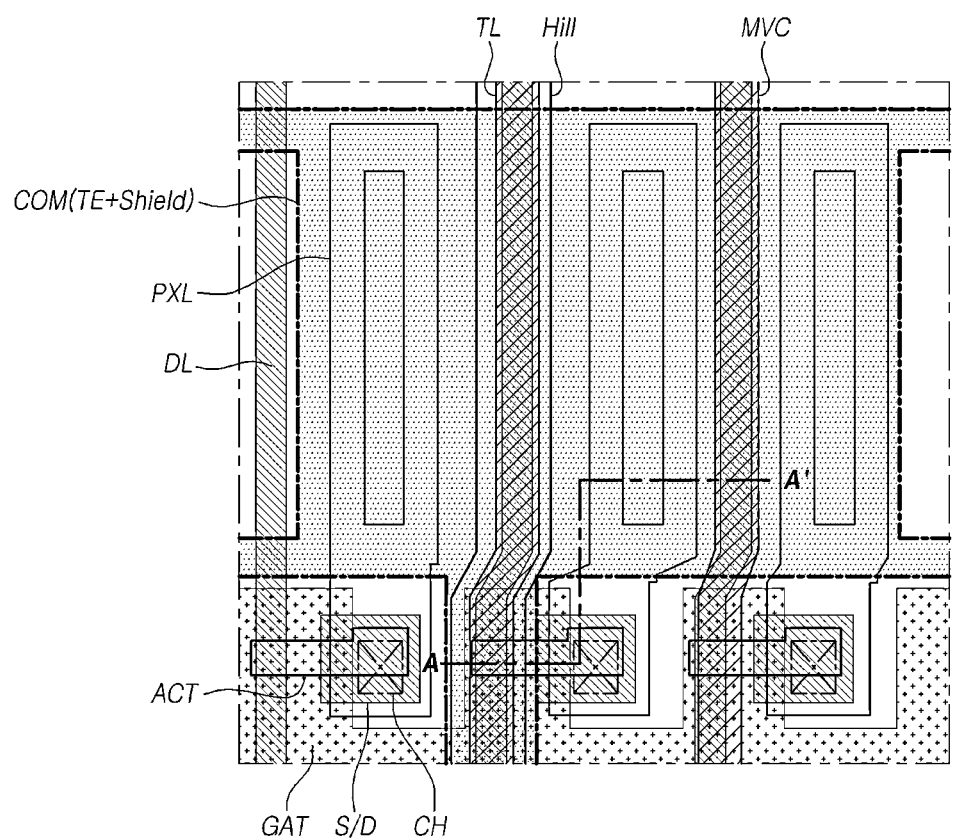
FIG. 7 illustrates an example of a planar structure in which the shielding pattern is disposed in the touch display device.
Figure 8:
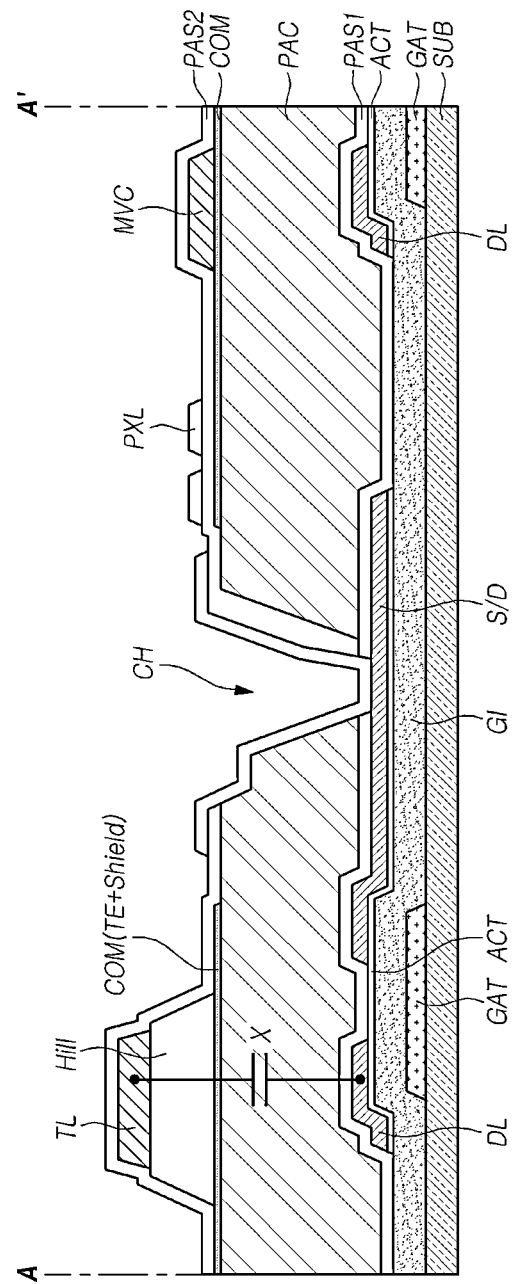
FIG. 8 illustrates an example of a cross-sectional structure of the portion A-A' in FIG. 7.

FIG. 7 illustrates an example of a planar structure in which the shielding pattern is disposed in the touch display device 100, and FIG. 8 illustrates an example of a cross-sectional structure of the portion A-A' in FIG. 7.

Referring to FIGS. 7 and 8, the gate electrode GAT may be disposed on the substrate SUB and the gate insulation layer GI may be disposed on the gate electrode GAT. In some cases, an additional insulation layer such as a buffer layer may be further disposed between the substrate SUB and the gate electrode GAT.

The active layer ACT may be disposed on the gate insulation layer GI and the data line DL and a source/drain electrode S/D may be disposed on the active layer ACT. The first passivation layer PAS1 and the planarization layer PAC may be disposed on the data line DL and the source and drain electrodes S/D, and the common electrode COM may be disposed on the planarization layer PAC.

The pixel electrode PXL disposed on the common electrode COM may be arranged so as to overlap with the common electrode COM with the second passivation layer PAS2 interposed therebetween, and may be connected to the source/drain electrode S/D through the contact hole CH.

Here, the common electrode COM may be the touch electrode TE to which the touch driving signal TDS is applied. The touch line TL may be disposed on the common electrode COM.

That is, the common electrode COM may be disposed between the data line DL and the touch line TL to provide the function of the shielding pattern.

In this case, the touch load reduction layer (Hill) having the specific height may be disposed between the common electrode COM and the touch line TL. The touch load reduction layer may be disposed on the common electrode COM in the area excluding a region where the common electrode COM and the pixel electrode PXL overlap and may be disposed between the common electrode COM and the touch line TL, so that the load of the touch line TL can be reduced.

In a portion where the touch line TL is connected to the common electrode COM, the touch line TL and the common electrode COM can be electrically connected through the contact hole formed in the touch load reduction layer. The example of FIG. 8 illustrates the cross section of a portion in which the touch line TL and the common electrode COM are not connected.

In some cases, the insulation layer may be further disposed between the touch load reduction layer and the touch line TL, so that the touch line TL may be prevented from being short-circuited with the common electrode COM disposed below the touch load reduction layer.

The resistance of the common electrode COM may be reduced by disposing the compensation pattern MVC in a region where the touch line TL is not disposed on the common electrode COM.

Here, the common electrode COM may have the structure in which a part thereof is opened.

As an example shown in FIG. 7, a part of the portion overlapped with the data line DL among the portions in which the touch line TL is not disposed on the common electrode COM, or the portion overlapped with gate electrode GAT, the source/drain electrode S/D, and the like may be the open structure.

That is, a part of the portion except for the portion where the common electrode COM forms the electric field with the pixel electrode PXL may be formed in the open structure, so that the load of the common electrode COM can be reduced.

As described above, the shielding pattern is disposed between the touch line TL and the data line DL by using the common electrode COM, so that it is possible to prevent the parasitic capacitance from being formed between the touch line TL and the data line DL and to prevent noise on the touch sensing signal TSS caused by the voltage variation of the data line DL.

In addition, the compensation pattern MVC may be disposed on the common electrode COM, or a part of the common electrode COM may be formed as the open structure so as to reduce the load on the common electrode COM.

In this case, since the common electrode COM is used as the touch electrode TE, the common electrodes COM may be arranged in the structure separated by touch electrode block units. Therefore, there may exist an area where a shielding pattern (shielding PTN) is not arranged in the boundary area of the common electrode COM.

Figure 9:
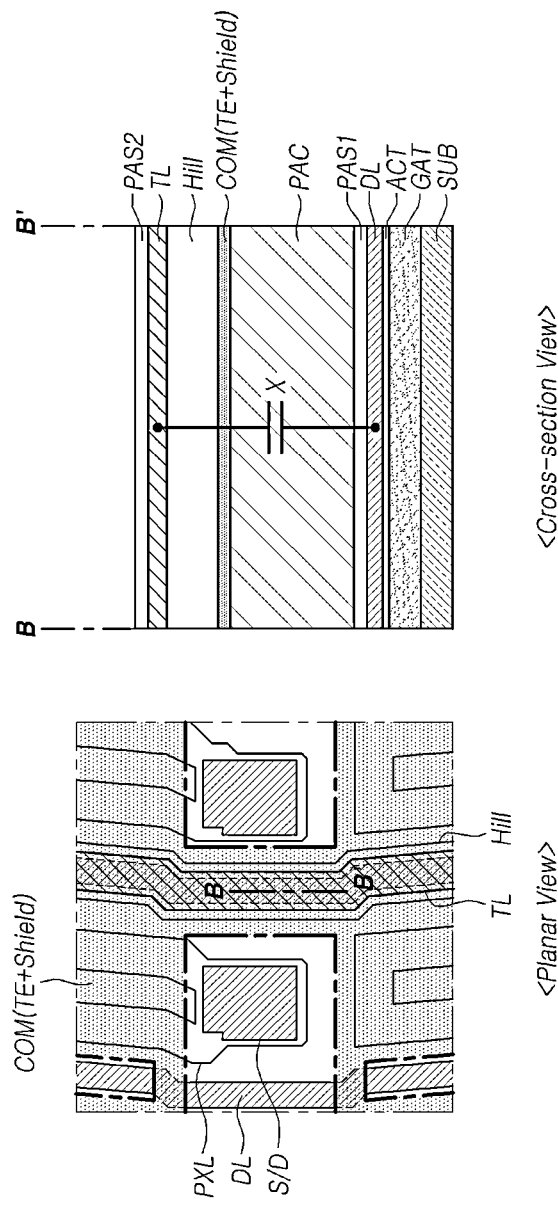
FIG. 9 illustrates an example of a structure in which touch lines and data lines are arranged in the inner region of the shielding pattern shown in FIG. 7.
Figure 10:
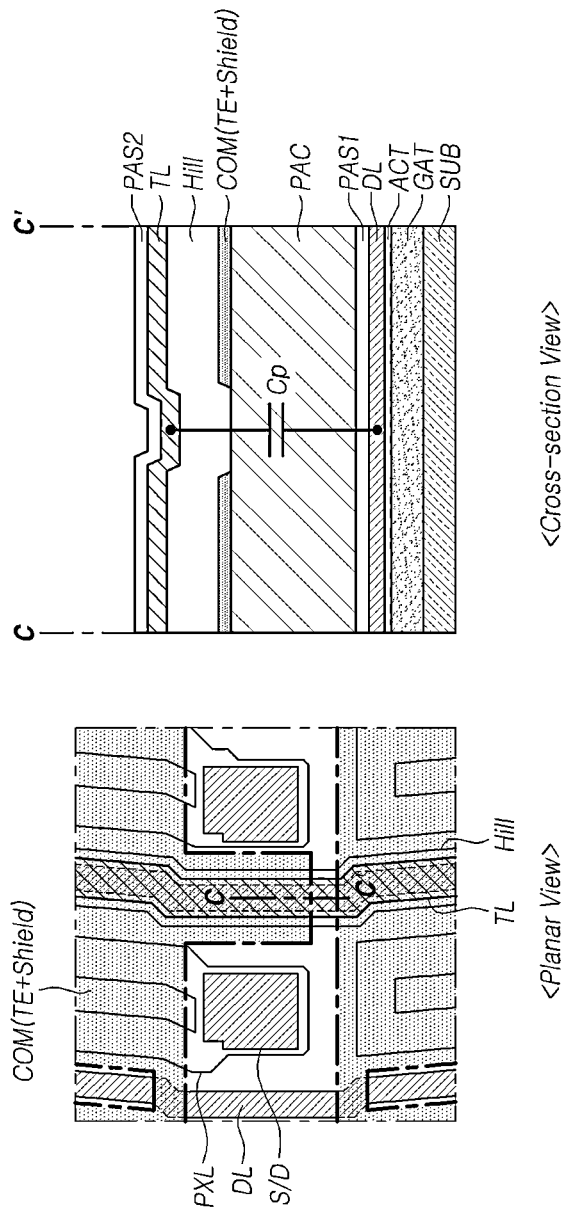
FIG. 10 illustrates an example of a structure in which touch lines and data lines are arranged in a boundary area of the shielding pattern shown in FIG. 7.

FIG. 9 illustrates an example of a structure in which the touch line TL and the data line DL are arranged in the inner region of the shielding pattern shown in FIG. 7. FIG. 10 illustrates an example of a structure in which the touch line TL and the data line DL are arranged in a boundary area of the shielding pattern shown in FIG. 7.

Referring to FIG. 9, there is described the structure in which the touch line TL and the data line DL are arranged in an inner area of the shielding pattern (Shielding PTN), that is, inside the touch electrode block.

Here, the planar structure is illustrated, for the convenience of explanation, except for the structure disposed under the data line DL.

At least a part of the touch line TL and the data line DL may be arranged to overlap with each other within the touch electrode block.

The shielding pattern including the common electrode COM may be disposed between the touch line TL and the data line DL. Therefore, it is possible to prevent the parasitic capacitance from being formed between the touch line TL and the data line DL.

In addition, since the shielding pattern is formed as a part of the common electrode COM, there may be provided with the advantage that the separate structure for applying the signal corresponding to the touch driving signal TDS to the shielding pattern is not required.

Referring to FIG. 10, in the boundary area of the touch electrode block, the common electrodes COM may be arranged in a structure separated from each other.

Therefore, the common electrode COM may not be disposed in the region in which the touch line TL overlapped with the data line DL, and thus may not provide the function of the shielding pattern.

A bypass structure of the touch line TL and the data line DL in the boundary area of the touch electrode block may nevertheless prevent noise on the touch sensing signal TSS (caused by parasitic capacitance) even in the area in which the shielding pattern is not arranged.

Figure 11:
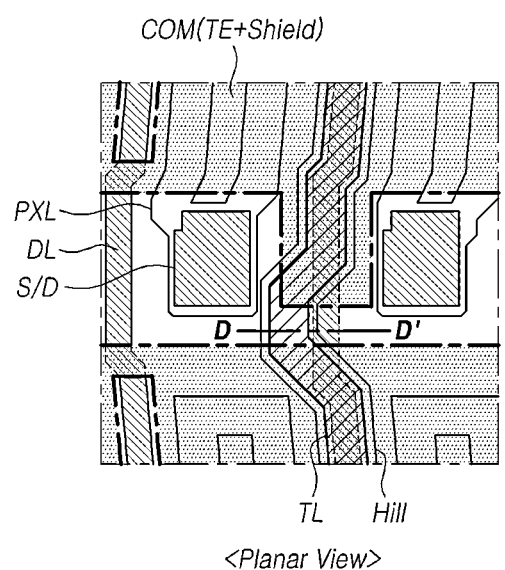
FIG. 11 illustrates another example of a structure in which touch lines and data lines are arranged in a boundary area of the shielding pattern shown in FIG. 7.
Figure 11:
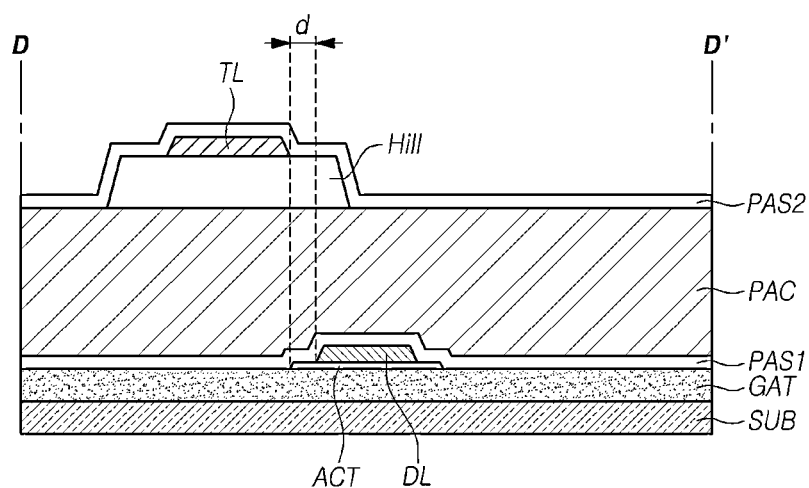

FIG. 11 illustrates another example of the structure in which the touch line TL and the data line DL are arranged in a boundary area of the shielding pattern shown in FIG. 7.

Referring to FIG. 11, the first passivation layer PAS1, the planarization layer PAC and the like may be disposed on the data line DL in the area between the adjacent common electrodes COM. The touch load reduction layer (Hill) and the touch line TL may be disposed on the planarization layer PAC.

That is, the common electrode COM may not be disposed on the data line DL.

In this case, the touch line TL located on the data line DL may be disposed, in the area between the adjacent common electrodes COM, in the area excluding the area overlapping with the area in which the data line DL is disposed.

For example, the touch line TL may be arranged in the bending structure or the bent structure so as to protrude in one direction in the area between adjacent common electrodes COM.

That is, the touch line TL may be arranged in the structure bypassing the area in which the touch line TL overlaps with the data line DL.

Also, since the touch line TL is arranged so as to bypass the area overlapping with the data line DL, the touch load reduction layer (Hill) disposed under the touch line TL may be also arranged in the bent structure in the area between adjacent common electrodes COM.

Furthermore, in the area between the adjacent common electrodes COM, the boundary of the touch line TL may overlap the boundary of the data line DL, or may be located outside the boundary of the data line DL.

Even if the boundary of the touch line TL overlaps with the boundary of the data line DL, since the touch line TL is arranged so as not to overlap the data line DL, it is possible to reduce the parasitic capacitance formed between the touch line TL and the data line DL.

As the example in FIG. 11, the touch line TL may be disposed so that the boundary of the touch line TL and the boundary of the data line DL are spaced apart by a predetermined distance d. Therefore, the parasitic capacitance formed in the horizontal direction or in the diagonal direction between the touch line TL and the data line DL can be reduced.

Alternatively, the touch line TL may be arranged so that the boundary of the touch line TL and the boundary of the data line DL are overlapped. Further, in some cases, a part of the touch line TL may be arranged to overlap the data line DL. In this case, the area of the overlapped portion of the touch line TL and the data line DL may be smaller than the area of the portion where the touch line TL and the data line DL do not overlap, thereby the parasitic capacitance formed between the touch line TL and the data lines DL may be reduced.

In this manner, in the boundary area of the touch electrode block in which the common electrode COM for providing the function of the shielding pattern is not disposed, the touch line TL and the data line DL are arranged so as not to overlap with each other so that noise on the touch sensing signal TSS caused by the parasitic capacitance can be prevented.

The bypass structure of the touch line TL may be formed through the structure in which the touch line TL is bypassed, but may be formed through the structure in which the data line DL is bypassed.

FIGS. 12A to 12D illustrate various examples of structures in which the touch line TL and the data line DL are arranged in a boundary area of the shielding pattern shown in FIG. 11.

Figure 12A:
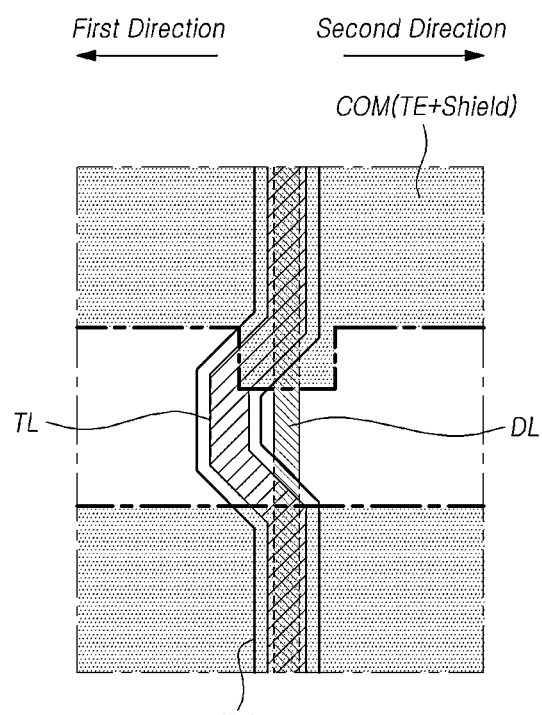
FIGS. 12A to 12D illustrate various examples of structures in which touch lines and data lines are arranged in a boundary area of the shielding pattern shown in FIG. 11.

Referring to FIG. 12A, in the area between adjacent common electrodes COM, the touch line TL may be arranged in the bent structure or the bending structure so as to protrude in the first direction. Alternatively, the touch line TL may be arranged to be bent so as to protrude in the second direction.

That is, the touch lines TL may be arranged in the bent structure so as to protrude in the direction intersecting with the direction in which the data lines DL are arranged, and may be disposed so as not to overlap the data lines DL.

The touch load reduction layer (Hill) disposed under the touch line TL may also be arranged in the bent structure according to the layout structure of the touch line TL.

Therefore, the parasitic capacitance formed between the touch line TL and the data line DL in the area between the adjacent common electrodes COM can be reduced.

Alternatively, the data line DL may be arranged in the structure bypassing the area where the touch line TL is disposed.

Figure 12B:
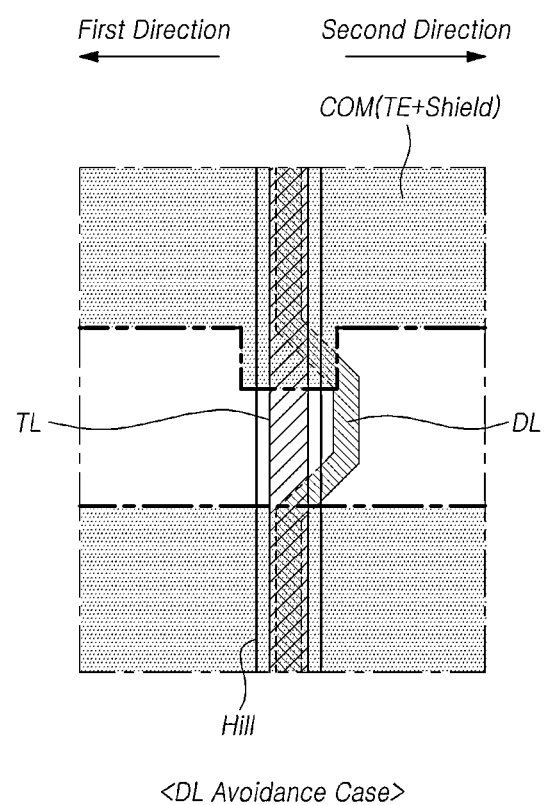

Referring to FIG. 12B, in the area between adjacent common electrodes COM, the data line DL may be arranged in the bent structure or the bending structure so as to protrude in the second direction. Alternatively, the data line DL may be arranged in the bent structure so as to protrude in the first direction.

That is, the data lines DL located in the overlapped area with the touch lines TL are arranged in the bent structure protruding in the direction intersecting the touch lines TL, so that the touch line TL and the data line DL may be arranged so as not to overlap each other.

Accordingly, the parasitic capacitance formed between the touch line TL and the data line DL can be reduced in the area between the adjacent common electrodes COM, thereby improving the performance of the touch sensing.

In addition, by adopting the bypass structure of the data line DL, it is possible to prevent the touch load reduction layer from being arranged in the bent structure in the area between adjacent common electrodes COM.

Alternatively, in the area between the adjacent common electrodes COM, both the touch lines TL and the data lines DL may be arranged in the bent structure.

Figure 12C:
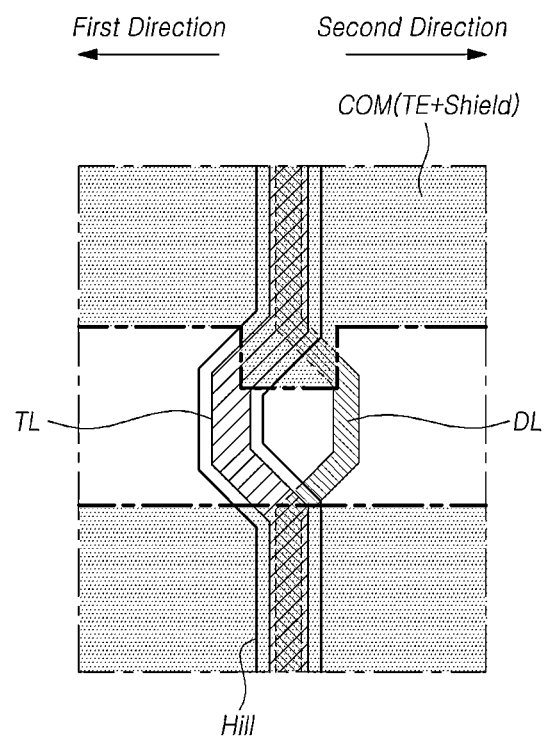

Referring to FIG. 12C, in the area between adjacent common electrodes COM, the touch line TL may be arranged in the bent structure so as to protrude in the first direction. In addition, the touch load reduction layers (Hill) disposed in the area between the adjacent common electrodes COM may be arranged in the bent structure according to the arrangement structure of the touch lines TL.

In the area between the adjacent common electrodes COM, the data lines DL may be arranged in the bent structure so as to protrude in the second direction.

That is, the data line DL may be arranged to protrude in the direction opposite to the direction to which the touch line TL protrudes.

As described above, in the area between the adjacent common electrodes COM, the touch line TL and the data line DL may be arranged so as to bypass the corresponding area in opposite directions to each other. Therefore, the interval or distance between the boundaries of the data lines DL and the touch line TL can be increased.

Accordingly, the parasitic capacitance formed between the touch line TL and the data line DL can be further reduced.

Alternatively, the width of the touch line TL or the data line DL disposed in the area between the adjacent common electrodes COM may be adjusted so as to prevent the parasitic capacitance from being formed between the touch line TL and the data line DL.

Figure 12D:
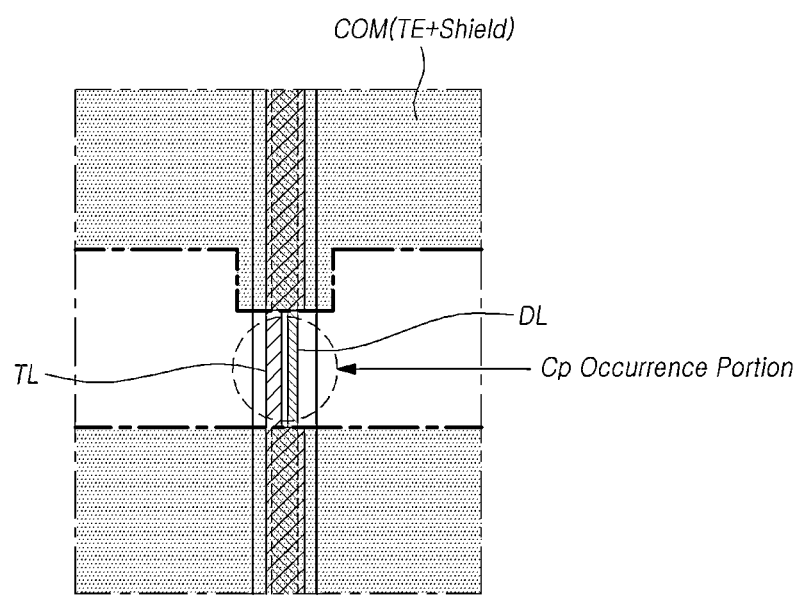

Referring to FIG. 12D, the width of the touch line TL in the area between the adjacent common electrodes COM may be smaller than the width of the portion where the touch line TL overlaps with the common electrode COM.

In addition, in the area between the adjacent common electrodes COM, the width of the data line DL may be narrower than the width of the portion where the data line DL overlaps with the common electrode COM.

The portion with the narrow width of the touch line TL and the portion with the narrow width of the data line DL can be arranged so as not to overlap with each other.

That is, the touch lines TL and the data lines DL may be arranged to be not overlapped with each other in an area where the common electrodes COM are not arranged by adjusting the widths of the touch lines TL and the data lines DL, so that it is possible to prevent parasitic capacitance from being formed between the touch line TL and the data line DL in the corresponding area.

As described above, in the boundary area of the touch electrode block in which the shielding pattern integrated with the common electrode COM cannot be arranged, the touch line TL and the data line DL are arranged so as not to overlap each other, so that noise on the touch sensing signal TSS caused by parasitic capacitance can be reduced.

Accordingly, the sensitivity of the touch sensing performed at the same time as the display driving can be improved, and the performance of the touch sensing can be improved.

The above described bypass structure of the touch line TL and the data line DL is an example, and the touch line TL and the data line DL may be implemented with different structures that do not overlap each other in the region between the adjacent common electrodes COM.

By applying the bypass structure of the touch line TL and the data line DL in the boundary area of the touch electrode block, the structure in the touch electrode block boundary area may be also applied to the inside of the touch electrode block.

Figure 13:
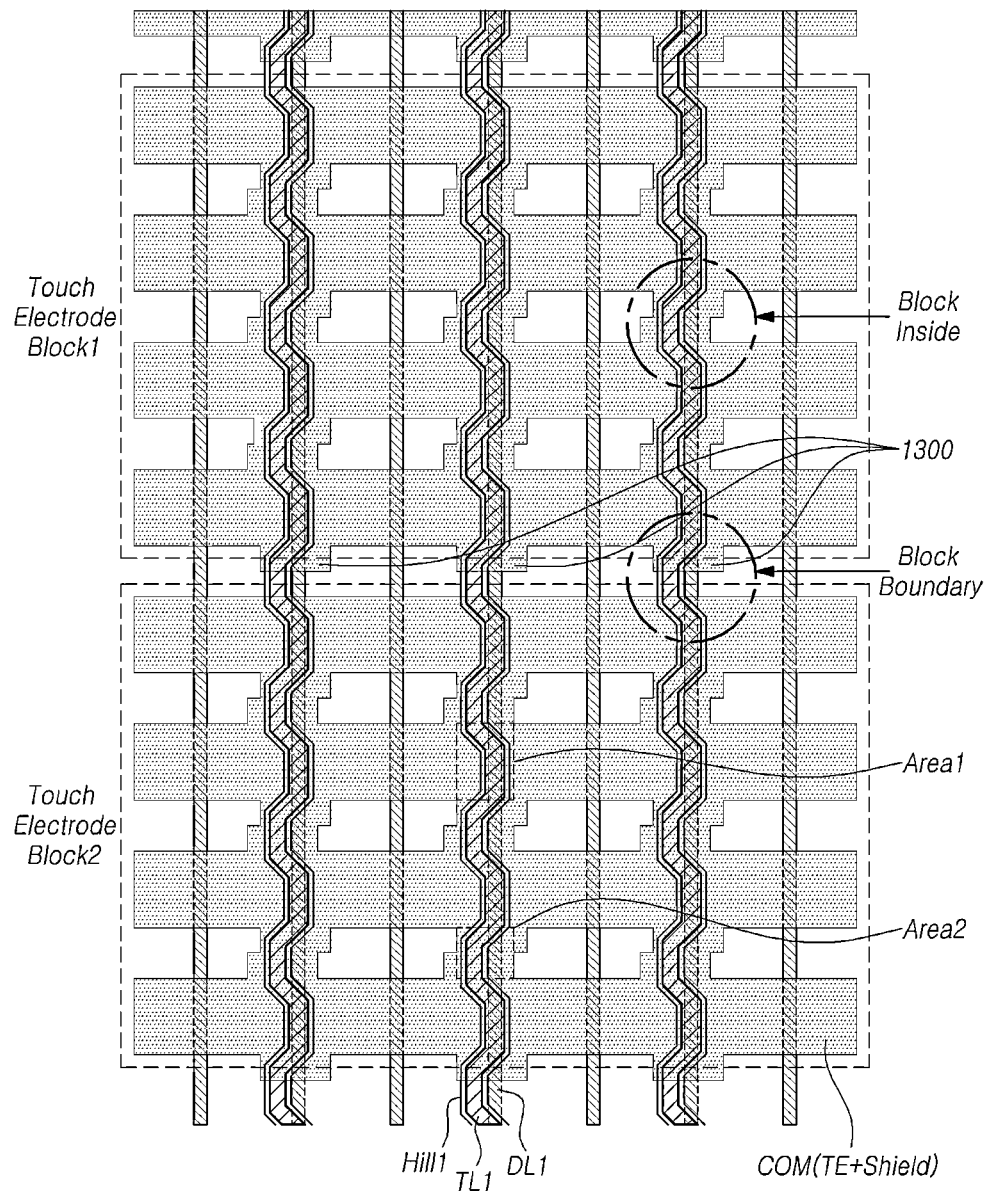
FIG. 13 illustrates an example of the planar structure in which the touch line and the data line are arranged in the touch electrode block and the boundary area.
Figure 14:
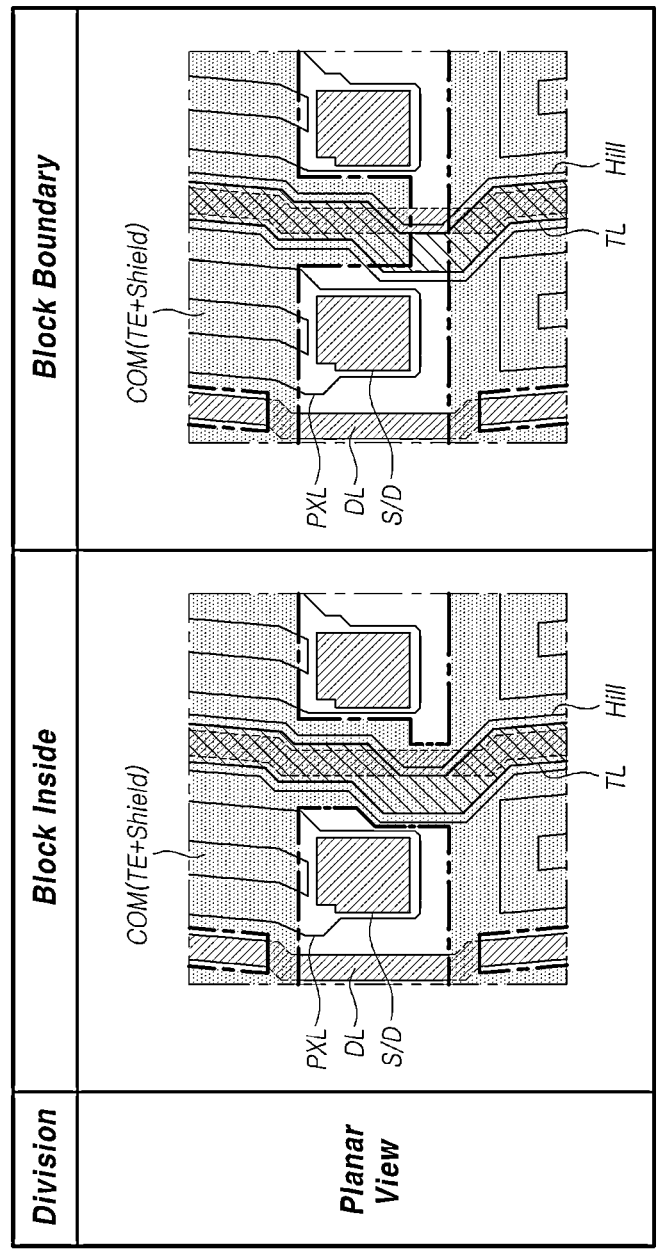
FIG. 14 is an enlarged diagram of the planar structure in which touch lines and data lines are arranged in the touch electrode block and the boundary area shown in FIG. 13.

FIG. 13 illustrates an example of the planar structure in which the touch line TL and the data line DL are arranged in the touch electrode block and the boundary area in a touch display device 100. FIG. 14 is an enlarged diagram of the planar structure in which touch lines TL and data lines DL are arranged in the touch electrode block and the boundary area shown in FIG. 13.

Referring to FIGS. 13 and 14, the plurality of data lines DL may be arranged in one direction in the touch display panel 110 and the plurality of touch lines TL may be arranged on the data lines DL in the same direction as the direction in which the data lines DL are arranged. Here, at least a part of the touch line TL may overlap the data line DL.

The plurality of common electrodes COM may be disposed between the data line DL and the touch line TL.

These common electrodes COM may be used as the touch electrode TE by being disposed in the structure separated from each other in the touch display panel 110.

That is, the common electrodes COM may be arranged in the structure separated by the unit of touch electrode block.

As described above, the common electrode COM may have a structure in which a part of the region except the region formed by the electric field with the pixel electrode PXL is open.

At this time, the common electrode COM disposed between the touch line TL and the data line DL may provide the function of the shielding pattern for preventing parasitic capacitance generation between the touch line TL and the data line DL. Alternatively, a part of the common electrode COM may be regarded as the shielding pattern (shielding PTN).

Here, in the boundary area of the touch electrode block, that is, the area where the common electrode COM is not disposed, the touch line TL may be arranged in the structure that bypasses the region overlapping the data line DL have. The touch load reduction layer (Hill) disposed under the touch line TL may also be disposed in the bypass structure according to the bypass structure of the touch line TL.

Alternatively, as described above, the data line DL may have the bypass structure, or both the touch line TL and the data line DL may have the bypass structure. The width of touch line TL and the data line DL may be adjusted.

Accordingly, the parasitic capacitance formed between the touch line TL and the data line DL disposed between the touch electrode blocks can be reduced.

The touch line TL and the data line DL arranged in the inner area of the touch electrode block may be arranged such that the structures of the touch line TL and the data line DL in the boundary area of the touch electrode block may be repeated at a specific intervals. For example, as illustrated in FIG. 13, the touch lines TL may be disposed at least partially in a bent shape in the first touch electrode block and the second touch electrode block. At this time, the data lines DL may be arranged in a substantially straight line shape, and the touch lines TL may be arranged at least partially in a bent shape. In such a case, the data lines DL may be arranged in a relatively less bent structure than the touch lines TL. In another arrangement, the data lines DL may be arranged at least partially in the bent shape in the first touch electrode block and the second touch electrode block. At this time, the touch lines TL may be arranged in a substantially straight line shape, and the touch lines TL may be arranged in a shape in which at least part of the structures are bent. In such a case, the touch lines TL may be arranged in the structure that is relatively less bent than the data lines DL.

That is, as shown in FIGS. 13 and 14, in the case that the touch line TL has the bypass structure in the boundary area of the touch electrode block, the bypass structure of the touch line TL may be repeated in the same manner in the inner area of the touch electrode block. Also, the structure of bypassing of the touch load reduction layer (Hill) in the inner area of the touch electrode block can be repeated in the same manner.

Alternatively, in the case that the data line DL has the bypass structure in the boundary area of the touch electrode block, the bypass structure of the data line DL may be repeated in the same manner in the inner area of the touch electrode block.

That is, in the boundary area of the touch electrode block, the touch line TL and the data line DL may be disposed in the inner area of the touch electrode block in the same pattern as that in which the touch line TL and the data line DL are arranged so as not to overlap each other.

In FIG. 13, the first touch line TL1 and the first data line DL1 may include a plurality of first areas (Area1) in which the region overlapping each other is larger than the region not overlapping each other. Also, the first touch line TL1 and the first data line DL1 may include a plurality of second areas (Area2) in which the region not overlapping each other is larger than the region overlapping each other. Here, in the second area (Area2), a portion of the touch line TL may be arranged so as not to overlap with the data line DL. Alternatively, a portion of the touch line TL may not overlap with the data line DL, but the boundary of the touch line TL and the boundary of the data line DL may be overlapped. A part of the portion of the touch line TL may overlap with the data line DL, and the area of the overlapping portion in which the touch line TL is overlapped with and the data line DL may be smaller than the area of the non-overlapping portion in which the touch line TL and the data line DL are not overlapped.

The first area (Area1) and the second area (Area2) may be repeatedly disposed along the direction in which the first touch line (TL1) and the first data line (DL1) are arranged. Only the second area (Area2) may be disposed in the boundary area between the first touch electrode block and the second touch electrode block. Since the common electrode COM or the shielding pattern does not exist in the boundary area between the two touch electrode blocks, the second area (Area 2) in which the overlapping area of the data lines DL is small may be arranged in the boundary area between the two touch electrode blocks in order to reduce the overlap capacitance of the touch line TL and the data line DL.

Further, the first touch electrode of the first touch electrode block may include the protrusion 1300 in which a part of the first touch electrode protrudes into the boundary area between the first touch electrode block and the second touch electrode block, and the protrusion 1300 may overlap with at least one of the first touch line TL1 and the first data line DL.

There may be further provided the first touch load reduction layer (Hill) disposed under the first touch line TL1 along the direction of the arrangement of the first touch line TL1.

In addition, the number of bent structures of the first touch line TL1 may be larger than the number of bent structures of the first data line DL1. Alternatively, the number of the bent structure of the first data line DL1 may be larger than the number of the bent structure of the first touch line TL1.

There may be further provided with the third touch electrode block including the third touch electrode, and the first touch line TL1 may be electrically connected to the third touch electrode of the third touch electrode block.

The structures of the touch line TL and the data line DL in the boundary area of the touch electrode block may be arranged repeatedly at the specific interval, so that it is possible to prevent the image abnormality with the help of the bypass structure of the touch line TL or the data line DL.

As described above, a part of the common electrode COM used as the touch electrode TE may be disposed between the touch line TL and the data line DL, so that the parasitic capacitance between the touch lines TL and the data line DL can be reduced.

In addition, in the boundary area of the touch electrode block, the touch line TL and the data line DL may be arranged so as not to overlap with each other, so that the parasitic capacitance between the touch line TL and the data line DL can be prevented from occurring even in the area where the common electrode COM is not disposed.

In addition, in the inner area of the touch electrode block, the structures of the touch line TL and the data line DL in the boundary area of the touch electrode block may be repeatedly arranged at regular intervals, so that it is possible to prevent the image abnormality with the help of the structure of the touch line TL and the data line DL in the boundary area of the touch electrode block.

The noise on the touch sensing signal TSS may be prevented by reducing the parasitic capacitance between the signal line for driving the display and the touch line TL, so that it is possible to improve the sensitivity of the touch sensing performed simultaneously with the display driving, and to improve the performance of the touch sensing.

It will be apparent to those skilled in the art that various modifications and variations can be made in the touch display panel and a touch display device of the present disclosure without departing from the technical idea or scope of the disclosure. Thus, it is intended that the present disclosure cover the modifications and variations of this disclosure provided they come within the scope of the appended claims and their equivalents.

What is claimed is:

1. A touch display device, comprising:
a data line extending in a first direction;
a first common electrode disposed on the data line;
a second common electrode disposed on a same layer as the first common electrode and spaced apart in the first direction from the first common electrode, wherein a first area is defined between the first and second common electrodes; and a touch line extending in the first direction, disposed on the first and second common electrodes, and overlapping at least a part of the data line, wherein at least one of the data line and the touch line comprises bent portions bent sideways in order that the data line and the touch line do not overlap each other.

2. The touch display device of claim 1, wherein respective portions of the data line and the touch line, in which the data line and the touch line do not overlap each other, are repeated in a predetermined interval in the first direction.

3. The touch display device of claim 1, wherein the bent portions are disposed in a predetermined interval in the first direction.

4. The touch display device of claim 3, wherein the touch line comprises the bent portions bent to one side and the data line comprises the bent portions bent to the opposite side.

5. The touch display device of claim 4, wherein one of the touch line and the data line is arranged in a relatively less bent structure than the other thereof.

6. The touch display device of claim 3, wherein the first area comprises at least parts of respective portions of the data line and the touch line, in which the data line and the touch line do not overlap each other.

7. The touch display device of claim 1, wherein the touch line and the data line overlap each other in a second area, and wherein the second area is larger than an area where the touch line and the data line does not overlap each other.

8. The touch display device of claim 1, further comprising:

a passivation layer disposed on the touch line; and
a pixel electrode disposed on the passivation layer.

9. The touch display device of claim 1, further comprising:

a touch load reduction layer disposed between the first and second common electrodes and the touch line,
wherein the touch line comprises the bent portion, and touch load reduction layer is bent along the bent portion of the touch line.

10. The touch display device of claim 1, wherein at least one of the first and second common electrodes serves as a touch electrode electrically connected to the touch line.

11. The touch display device of claim 10, wherein the first common electrode touch electrode comprises a protrusion protruding toward the second common electrode.

* * * * *

UNITED STATES PATENT AND TRADEMARK OFFICE
CERTIFICATE OF CORRECTION

| | | |
|---|---|---|
| PATENT NO. | : 11,803,267 B2 | Page 1 of 1 |
| APPLICATION NO. | : 17/990241 | |
| DATED | : October 31, 2023 | |
| INVENTOR(S) | : Jinseong Kim et al. | |

It is certified that error appears in the above-identified patent and that said Letters Patent is hereby corrected as shown below:

On the Title Page

Column 1, Item (30), the specified date should read:
Dec. 28, 2018

Signed and Sealed this
Second Day of January, 2024

Katherine Kelly Vidal
*Director of the United States Patent and Trademark Office*